US008342546B2

(12) United States Patent
Bryant

(10) Patent No.: US 8,342,546 B2
(45) Date of Patent: Jan. 1, 2013

(54) TWO-WHEELED IN-LINE VEHICLE WITH TORQUE GENERATOR

(76) Inventor: Robert H. Bryant, Bellevue, WA (US)

( * ) Notice: Subject to any disclaimer, the term of this patent is extended or adjusted under 35 U.S.C. 154(b) by 0 days.

(21) Appl. No.: 11/053,568

(22) Filed: Feb. 7, 2005

(65) Prior Publication Data

US 2007/0182123 A1 Aug. 9, 2007

Related U.S. Application Data

(60) Provisional application No. 60/543,103, filed on Feb. 7, 2004.

(51) Int. Cl.
*B62M 1/20* (2006.01)

(52) U.S. Cl. ........ 280/87.041; 280/89; 280/90; 280/272

(58) Field of Classification Search ............. 280/87.041, 280/89, 90, 272
See application file for complete search history.

(56) References Cited

U.S. PATENT DOCUMENTS

| 6,179,307 | B1 * | 1/2001 | Mao | 280/87.041 |
| 2001/0030404 | A1 * | 10/2001 | Liu | 280/87.041 |
| 2002/0074756 | A1 * | 6/2002 | Tsai | 280/87.041 |
| 2002/0089138 | A1 * | 7/2002 | Reynolds et al. | 280/87.041 |
| 2002/0145264 | A1 * | 10/2002 | Hung | 280/87.041 |
| 2003/0122334 | A1 * | 7/2003 | Laporte | 280/87.041 |

* cited by examiner

*Primary Examiner* — Tashiana Adams
*Assistant Examiner* — Marlon Arce
(74) *Attorney, Agent, or Firm* — Cozen O'Connor

(57) ABSTRACT

An in-line, two-wheeled vehicle, with a torque generator operably secured thereto is disclosed. The torque generator generates a defined auxiliary torque about the point-of-contact of the steering wheel, and it is sized to balance the naturally occurring torques arising at slow speeds about the point-of-contact of the steering wheel, thereby improving the stability and control of the vehicle. In one disclosed embodiment, the vehicle is a stand-up riding board. In another disclosed embodiment, the vehicle is a cycle, such as a bicycle or the like. Torque generator structures such as using an elastic member, mechanical linkage, and dampening systems are also disclosed.

20 Claims, 11 Drawing Sheets

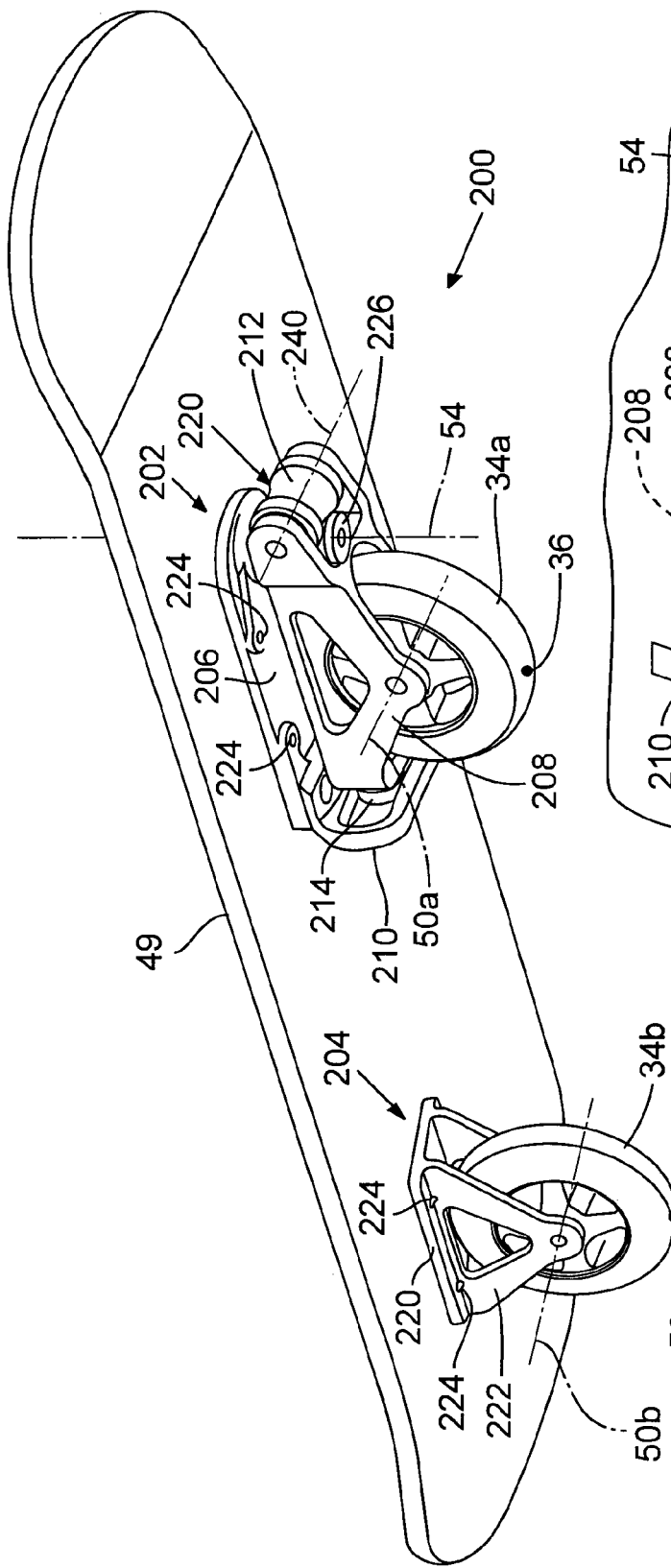
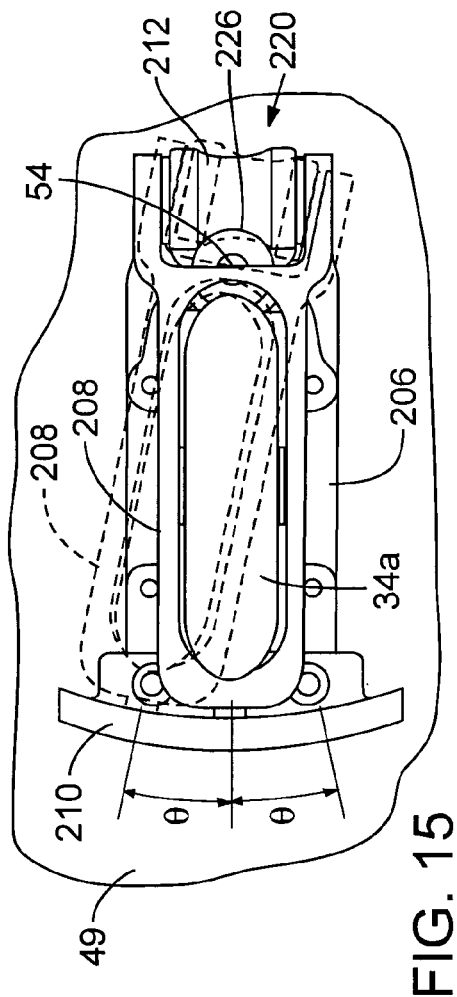
FIG. 14
FIG. 15

TWO-WHEELED IN-LINE VEHICLE WITH TORQUE GENERATOR

CROSS-REFERENCE TO RELATED APPLICATION

This application claims priority to U.S. Provisional Patent Application Ser. No. 60/543,103 filed on Feb. 7, 2004.

TECHNICAL FIELD

The invention is a two-wheeled vehicle. In particular, the invention concerns an in-line two-wheeled vehicle such as a riding board or the like that is made more stable and maneuverable with a torque generator about the steering axis of the vehicle operably secured thereto.

BACKGROUND OF THE INVENTION

Historically, wheeled vehicles and especially in-line, two-wheeled vehicles such as bicycles, motorcycles, scooters, and the like, have been popular forms of transportation, exercise, and sport. More recently, such vehicles are being used in particularly rugged environments including unimproved roads and rough terrain. For example, similar to a conventional snowboard operating over a snow-covered hill, it is desirable to use an in-line two-wheeled vehicle to travel downhill over rough terrain.

In general, a rider balances on an elongated frame of the vehicle while it is either being propelled by gravity, the rider or self-propelled, and steers the vehicle either by tilting the vehicle, as with a skateboard, or rotating a steering mechanism, such as the handle bar of a conventional bicycle, to turn at least one of the wheels on a fixed axis of rotation. In virtually all uses of such vehicles, it is desirable for the vehicle to travel smoothly, steer easily and responsively, and remain stable during both steady-state and dynamic operation.

The rider on a two-wheeled vehicle is a critical element in the dynamic balancing of the system, which must be stable for successful operation of the vehicle. In particular, similar to a person balancing a stick on his finger, the rider of a two-wheeled vehicle is the active element maintaining stability of the system. The rider develops particular skill to use his or her senses (i.e., eyes, ears, sense of balance, etc.) to detect if there is a need for corrective balancing action, and the degree and type of corrective force needed.

Preferably, stable operation includes the steering wheel remaining in its commanded position (i.e., either aligned straight or at a commanded turn angle) when no dynamic input or other disturbances are acting on the steering mechanism. Such stable operation is particularly desirable, but especially difficult to maintain, when the vehicle is operated over rough terrain and/or at slow speeds.

As children first attempting to ride a bicycle learn, maintaining dynamic balance on a two-wheeled bicycle requires experience and skill. Numerous forces act on a two-wheeled vehicle to keep it dynamically balanced during operation. These forces include gravity, inertia, friction, and gyroscopic forces generated by the spinning wheels. A rider typically manipulates the vehicle by leaning and turning the handlebar to maintain dynamic balance and thereby maneuver the vehicle.

Particularly skilled riders can maintain stable, dynamic balance of traditional bicycles traveling straight without holding the handlebars. In such case, they may even be able to turn their bicycles left or right simply by leaning their body and tilting the vehicle. In general, the faster the bicycle is traveling the easier it is for the rider to maintain such hands-free, stable, dynamic balance. However, minor transient disturbances, such as those associated with riding on an uneven or rough road surface, or the rider needing to change speed or steering directions, quickly destabilize the vehicle.

In more technical terms, for any given two-wheeled vehicle, there is an overall operating envelope of speeds and turn radii for a given terrain in which the vehicle is expected to operate effectively. Similarly, for any given two-wheeled vehicle there is a controllable operating envelope of speeds and turn radii for a given terrain in which the riders' ability to simply tilt the vehicle in one direction or the other is sufficient to correct dynamic instabilities arising during operation of the vehicle, while still maintaining controllability of the vehicle (e.g. also maintaining tilting commanding the vehicle to turn). Unfortunately, with conventional two-wheeled vehicles, the controllable operating envelope is much smaller than the desired operating envelope of the vehicle. Accordingly, traditional two-wheeled vehicles are hand-steered to maintain controllability and stability of the vehicle throughout the entire operating envelope of the vehicle.

Previously, the key elements leading to two-wheeled vehicle stability have not been fully understood. This has limited the size of the controllable operating envelope of traditional two-wheeled vehicles. A typical bicycle or scooter will have a pair of in-line wheels operably secured to a base. Both wheels are typically rotatably secured to the base, such that they rotate freely about their axles to carry the vehicle on a substantially planar running surface. In addition, the front wheel is usually pivotally secured to the base along an axis, commonly known as a steering axis, which is substantially orthogonal to the surface such that the front wheel turns from side-to-side with respect to the base along this axis.

In general, and as discussed more fully in U.S. Pat. No. 5,160,155 to Barachet, the front wheel's point of contact with the planar running surface of the conventional two-wheeled vehicle is behind the point at which a line extended from the steering axis contacts the same surface. The distance between these two points is commonly referred to as the vehicle's "trail." This orientation allows the front wheel to operate like a conventional caster. Namely, because of a moment arm defined by the trail, the front wheel will turn in the direction of the bases' tilt. Accordingly, to some extent, a rider can steer the vehicle simply by tilting the base to one side.

Conventional two-wheeled vehicle dynamic stability analyses focus on determining the optimal length of the trail for a given design. This process has typically been a trial-and-error approach for a given commercial product. For example, as documented in an article titled "A Fresh Look At Steering Geometry" of the February 1981 issue of Cycling USA, Mathematics professor John Corbet experimented with trail lengths ranging from ⅞ of an inch to 4 5/16 inches. He found that with the trail set at approximately 1⅝ inches the bicycle felt "nervous." With a trail of 1 3/16 inches, it had "the sort of hands-off stability which seems desirable yet still turns easily," and with the trail of 2 15/16 inches, "it was very heavy feeling."

These conventional stability studies of hand-steered two-wheeled vehicles focus on the dynamic stability of the vehicle during straight, steady-state operation. Accordingly, experimentation has found that the larger the trail, the greater the straight, steady-state stability of the vehicle. However, such stability usually comes at the expense of vehicle controllability and dynamic stability of the vehicle during a turn. These studies of hand-steered two-wheeled vehicles are characterized by their qualitative nature and subjective results. More-over, the studies focus virtually exclusively on the vehicle's trail, and they do not explicitly define the qualities that determine the operational desirability of a vehicle. Instead, they concentrate on "hands-off stability" without defining or evaluating controllability.

Barachet shows two-wheeled vehicles having different caster angles (also referred to as the "rake angle" which is defined as the angle between the steering axis and vertical). Arguably, these figures could be interpreted to suggest that caster angle is another important factor in two-wheeled vehicle stability (i.e. the ability of the vehicle to remain in a state in the presence of disturbances and with no rider input) and control (i.e., the ability of the board to respond in a predictable and desirable manner to rider commanded inputs.) Barachet struggles with finding an optimal design that provides desirable performance over the envelope of operations while having a fixed trail and caster angle. He acknowledges the limitations with his designs by showing several approaches aimed at biasing the steering wheel to a neutral position, and by depending upon unusual athletic techniques of the rider to control and maintain stability of the vehicle.

Another example of the limitations found with conventional analysis of two-wheeled vehicle stability and control can be found in the book *Bicycling Science* (2nd edition 1995), written by Massachusetts Institute of Technology engineering instructor David Wilson and Frank Whitt. This book summarizes the state-of-the-art of bicycle engineering, and is grounded in solid mathematical-based technical discussions that reflect the support and involvement of a broad spectrum of experts in the field.

A chapter in this book, entitled "Balancing and Steering," discusses the current state of understanding of in-line, two-wheel vehicle dynamics and the handling qualities of bicycles. It ultimately concludes that "the balancing and steering of bicycles is an extremely complex subject on which there is a great deal of experience and rather little science."

This situation exists despite the attention of several famous mathematicians and analytical engineers attempting to quantitatively understand these concepts. They conclude that caster angle and trail are important factors in the handling of a two-wheeled vehicle, but they acknowledge that there is no consensus or understanding as to why these elements are important, or if there are other elements that are equally important in understanding the concepts. Accordingly, as with professor John Corbet's work previously described, their work has focused on empirical efforts to quantify the ranges and combinations of these two dimensions as to their relation to "good" handling of a bicycle. This has led to a good understanding of which values and combinations of caster angle and trail that can produce acceptable handling performance, but not much insight as to why.

Some inventors have attempted to improve a wheeled-vehicles' ability to operate over rough terrain. However, such improvements have typically been in the form of introducing improved suspension systems between the wheels and the base of the vehicles. For example, U.S. Pat. No. 5,868,408 to Miller teaches mounting two pair of wheels to a board. One pair of wheels is mounted toward the front of the board and the other pair of wheels is mounted toward the rear of the board. Each pair of wheels is pivotally secured to the board, such that the wheels rotate about respective steering axes. Each wheel is linked to the steering axis through a dynamic linkage that is spring-biased to a neutral position. As one of the wheels hits an obstacle, the spring is compressed, and the wheel is deflected upward to allow the obstacle to pass.

The quality that determines a vehicle's desirability with regards to riding over irregular or rough surfaces is its ability to absorb the influence of the terrain or isolate the rider from the influence of the terrain without diminishing the rider's ability to control the vehicle. As described above, much effort has been expended designing and implementing suspensions that will absorb the dynamics of the terrain by putting suspension systems between the wheels and the base of the vehicle. Although this approach offers some benefits, it does not change the inherent characteristics of the vehicle that determine the susceptibility to the roughness of the terrain or ability to remain controllable particularly at slow speeds.

There are two axes associated with a vehicle that are pertinent to the dynamics that are induced by the terrain. These are the vehicle's roll axis (which runs longitudinally through the vehicle and is nominally horizontal) and the pitch axis (which is perpendicular to the roll axis and is nominally horizontal). A four-wheeled vehicle is influenced by terrain roughness about both axes while an in-line two-wheeled vehicle is influenced only about the pitch axis. Therefore, the in-line two-wheeled vehicle is much more accommodating of irregular or rough riding surfaces by its inherent characteristics. This is evidenced by a motorcycle's ability to negotiate much rougher terrain than a four-wheeled vehicle such as a Sport Utility Vehicle.

While the suspension linkages in Miller offer a smoother ride, they do not teach or suggest a way for allowing a two-wheeled vehicle to remain dynamically stable, but still highly maneuverable, during both straight and turning operations.

SUMMARY OF THE INVENTION

Accordingly, despite the improvements of the conventional devices, there remains a need for an economical, two-wheeled vehicle that is highly stable, even over rough terrain, but still highly maneuverable simply by a user tilting the vehicle with their feet as is done with a snowboard, surfboard or skateboard. In addition to other benefits that will become apparent in the following disclosure, the present invention fulfills these needs.

This invention provides an in-line, two-wheeled vehicle, with a torque generator operably secured thereto so as to generate a defined auxiliary torque about the point-of-contact of the steering wheel. The auxiliary torque generated is sized to balance the naturally occurring torques arising at slow speeds about the point-of-contact of the steering wheel thereby improving the stability and control of the vehicle. In one disclosed embodiment, the vehicle is a stand-up riding board. In another disclosed embodiment, the vehicle is a cycle, such as a bicycle or the like.

BRIEF DESCRIPTION OF THE DRAWINGS

FIG. 14 is an isometric lower view of an in-lined two-wheeled vehicle having a cam follower torque generator operably secured thereto in accordance with an embodiment of the present invention.

FIG. 15 is a cross-sectional view of the cam follower torque generator of FIG. 14, taken along lines 15-15 of FIG. 14 showing possible pivoting movement about steering axis 54.

DETAILED DESCRIPTION

Figure 1A:
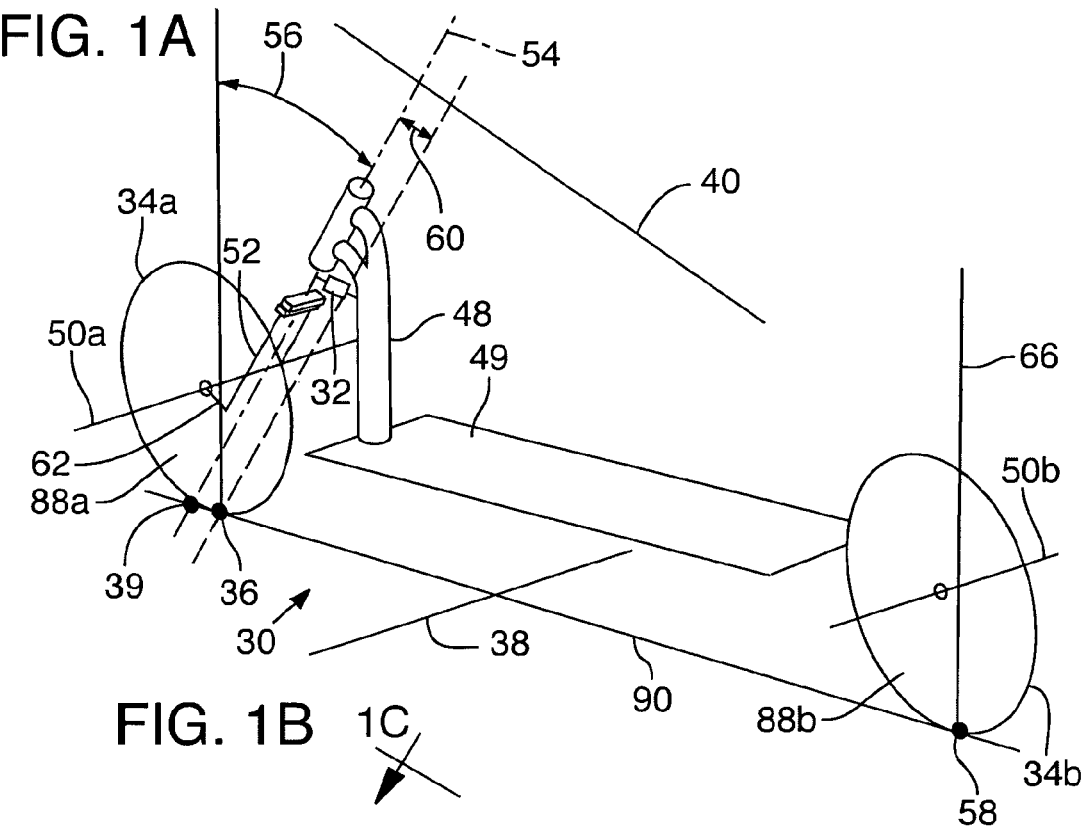
FIG. 1A is an isometric schematic view of a two-wheeled vehicle in accordance with a preferred embodiment of the present invention.
Figure 1B:
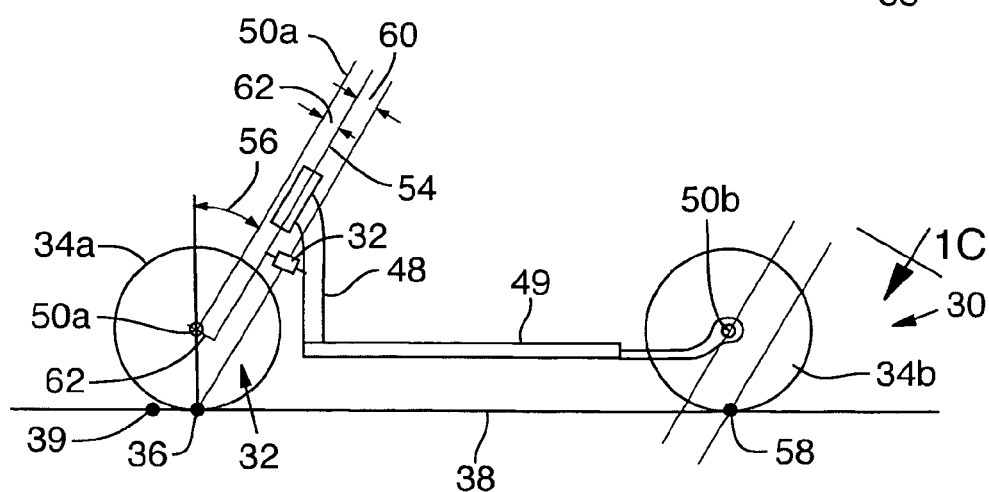
FIG. 1B is a side view of the two-wheeled vehicle of FIG. 1A.

This invention provides an in-line, two-wheeled vehicle 30, with at least one of the wheels being pivotally secured to the vehicle to define a steering axis 54 and a point of contact 36 with the ground. A torque generator 32 is operably secured to the vehicle 30 so as to generate a defined auxiliary torque about the point-of-contact 36 of the steering wheel 34a. The auxiliary torque generated is sized to balance the naturally occurring torques arising at slow speeds about the point-of-contact 36 of the steering wheel 34, thereby improving the stability and control of the vehicle 30. In one disclosed embodiment, the vehicle is a stand-up riding board 30" (FIGS. 3, 14-17). In another disclosed embodiment, the vehicle is a cycle 30' (FIG. 1), such as a bicycle or the like.

The torque generator 32 can be formed by a variety of structures including an elastic member, such as a spring 102 (FIG. 4) or the like, mechanical structures 202 (FIG. 14), and dampening systems 300 (FIGS. 10-13). Other disclosed embodiments include making the auxiliary torque generated by the torque generator 32 adjustable, and selectively actuating the torque generator 32 based on detected conditions such as the speed of the vehicle. Each of these concepts is discussed in greater detail below and in the context of FIGS. 1A-17.

A. In-Line Two Wheel Vehicle Geometry

One of the primary factors leading to in-line two-wheeled vehicle 30 instability is the fact that the forces leading to this instability and a rider's ability to detect and correct for those instabilities have been misunderstood.

Figure 1C:
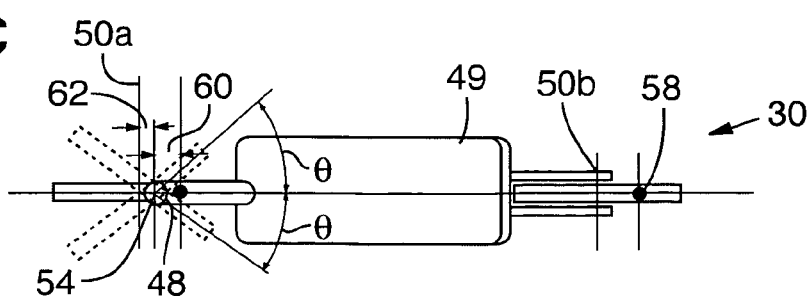
FIG. 1C is a top view of the two-wheeled vehicle of FIG. 1A.
Figure 1D:
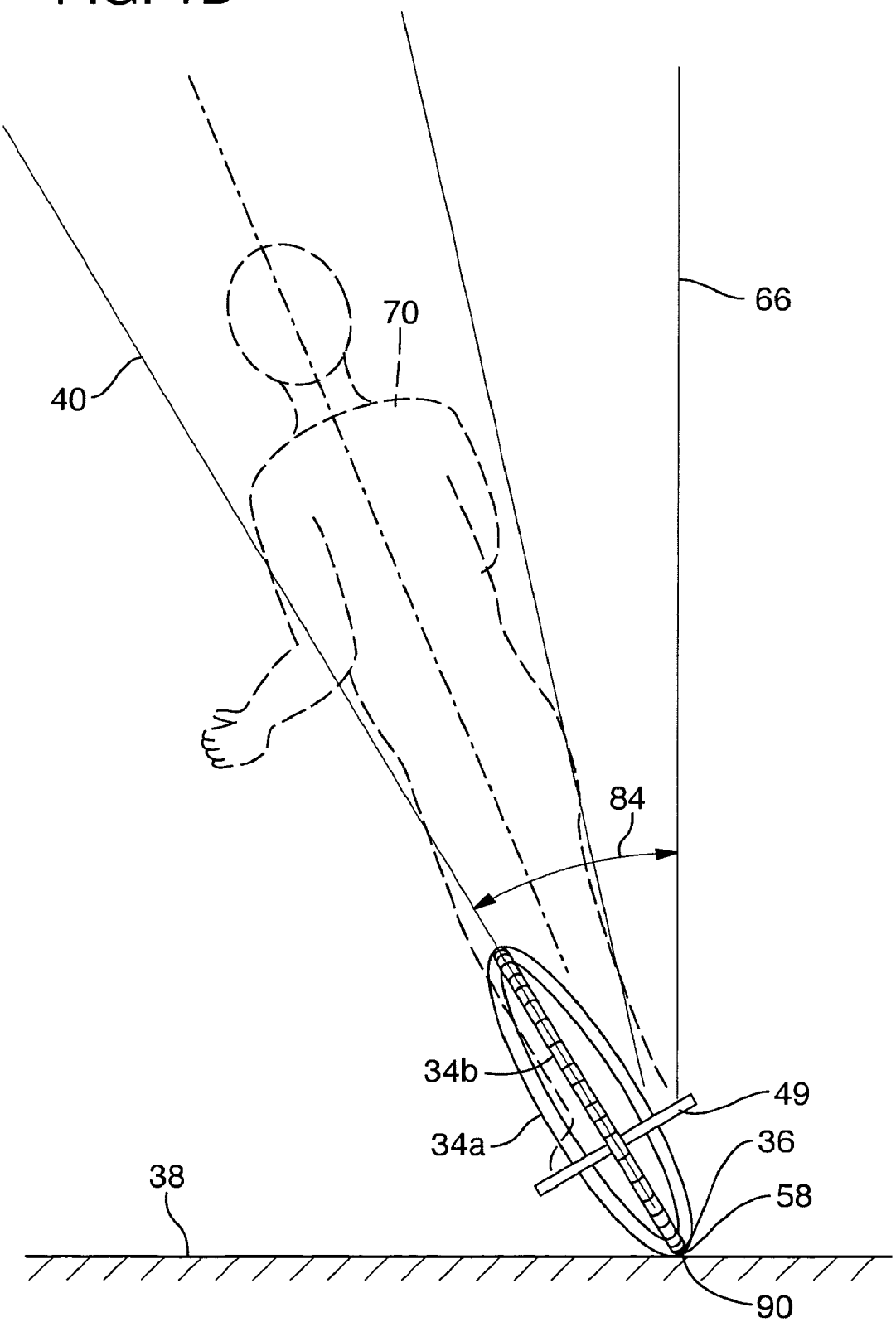
FIG. 1D is a rear view of the two-wheeled vehicle of FIG. 1A showing a possible side-ways' tilting of the vehicle and its related orientation geometry.
Figure 2:
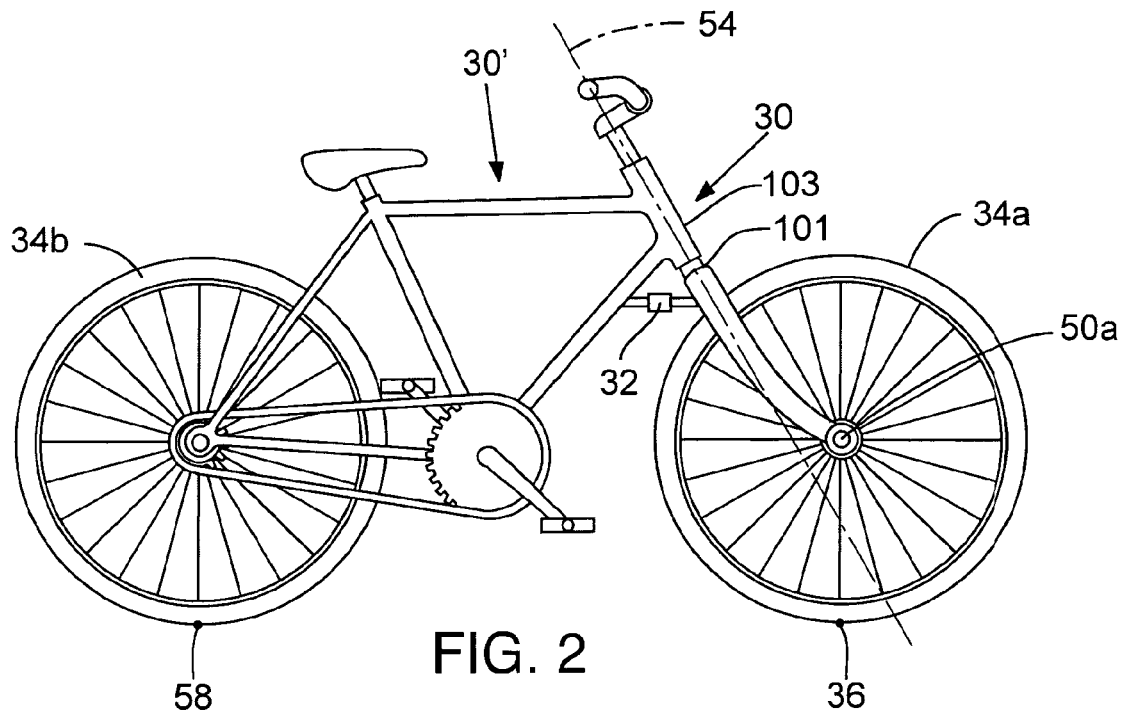
FIG. 2 is a side view of a two-wheeled vehicle in accordance with an embodiment of the present invention.
Figure 3:
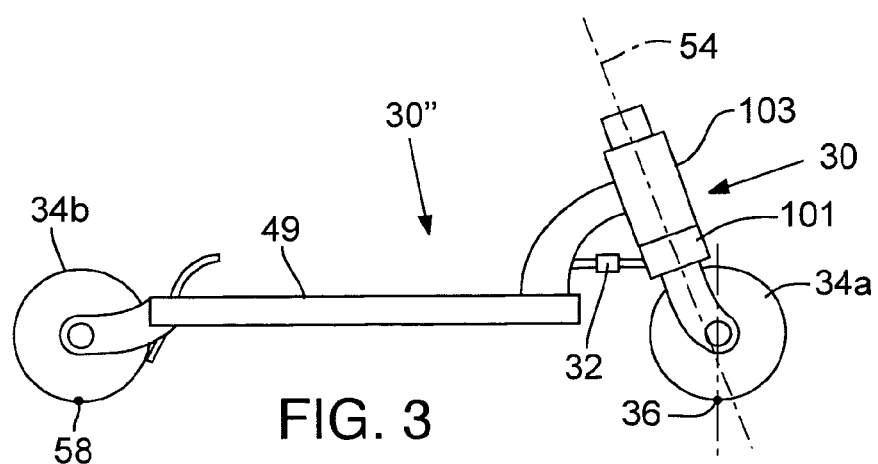
FIG. 3 is a side view of a two-wheeled vehicle in accordance with another embodiment of the present invention.

In particular, and referring specifically to FIGS. 1A-D, which include many aspects of a conventional two-wheeled vehicle, a conventional two-wheeled vehicle includes the front steering wheel 34a and an in-line rear wheel 34b operably secured to a base. Both wheels 34a, 34b are typically rotatably secured to the base 48, which preferably has a planar surface 49, such that they rotate freely about their axles 50a, 50b to carry the vehicle 30 on the ground plane 38. In addition, the steering wheel 34a is usually pivotally secured to the base 48, preferably with a fork 52, and aligned along an axis, commonly known as a steering axis 54, which is substantially orthogonal to the surface (i.e., to within the caster angle 56) such that the front wheel 34a turns from side-to-side with respect to the base 48 along this axis 54 to define steering angle ($\phi$) (FIG. 1C). The orientation of the steering wheel with respect to the steering axis is fixed in a conventional two-wheeled vehicle.

The geometry of these components define several relationships that are important to understanding the stability problems associated with the designs of conventional two-wheeled vehicles, and the solution offered by the torque generator stabilization of the present invention. These relationships include the ground plane 38 and the vehicle plane 40, defined as the plane including the rear wheel's area of contact, which is preferably a point of contact 58, and the steering axis 54. The trail 60 is the distance between the steering wheel's point of contact 36 with the ground plane 38 and the point 39 at which a line extended from the steering axis contacts the ground plane 40. An optional steering wheel offset 62 is the closest distance between the steering wheel's axis of rotation, or axle 50a and the steering axis 54.

B. Operation of In-Line, Two Wheeled Vehicle

Operators of in-line, two wheeled vehicles 30 must successfully accomplish two goals when riding them. First, they must balance the rider/vehicle system, and second, they must simultaneously guide or steer them along a desirable path. In general, the operator accomplishes these goals by using their feet to tilt the planar surface 49 on which the rider is standing. During operation of the vehicle 30, the base 48 tilts side-to-side with respect to the ground plane 38 defining a roll angle 84 (FIG. 1D) as the angle between the vehicle plane 40 and a vertical plane 66 perpendicular to the ground plane 38.

The roll-angle 84, in turn, induces the steering wheel 34a and steering assembly to turn about the steering axis 54. The amount the plane of the steering wheel turns about the steering axis 54 from the null position (defined as the planes of the two wheels when coincident) will be called the steering angle ($\phi$) (FIG. 1C). The amount of $\phi$ that relates to a given roll-angle 84 depends, in part, upon the trail (See FIG. 3) and the caster angle 56 as show in FIG. 1A-D. A positive trail means that point-of-contact 36 must be behind the point that steering axis 54 penetrates the ground. If the trail 60 is positive, a given roll-angle 84 will produce a positive $\phi$ that will turn the in-line vehicle in the direction of the roll-angle 84 (i.e., $\phi$ and roll-angle are coordinate).

The vehicle is preferably configured so that during regular use, a constant and finite roll-angle 84 produces a constant and finite $\phi$.

Known in-line vehicles have a common characteristic. Namely, above a certain speed—a finite roll-angle 84 produces a finite $\phi$. However, the vehicle is not easily controllable below that speed. This means that stability of the dynamics about the roll-angle is conditioned on speed. Namely, at high speed there is stability about the roll-angle 84 and at low speed the dynamics about the roll-angle 84 are unstable.

To understand the stability about the steering axis 54 it is necessary to understand the torques about steering axis that result from the forces acting on the steering assembly that primarily occur at the point-of-contact 36 of the steering wheel 34*a*. In the following discussion a negative torque is a torque that tends to increase the magnitude of $\phi$ whereas a positive torque is one that decreases the magnitude of $\phi$. A non-zero $\phi$ or roll axis 84 will induce a negative torque about the steering axis 54 and if not countered by a positive torque of equal size, will increase $\phi$ until the steering assembly hits a stop.

The other torques acting at the point-of-contact 36 of the steering wheel 34*a* include the force required to counter the centrifugal force associated with going around a turn. This torque is always positive (assuming a positive trail) meaning that the force due to centrifugal force always tends to reduce the steering angle.

To further understand the dynamics about the steering axis 54, the concepts above must be defined mathematically:

$T_t$=torque due to turning $T_n$=torque due to $\phi$ and steering axis 54 (n subscript for negative torque)

$T_s$=sum of all torques about steering axis 54

To further facilitate our understanding, $T_t$ and $T_n$ will be described in terms of their dynamic variable dependencies:

$T_t = T_t (v, \text{roll axis } \mathbf{84})$ ($v$=speed of vehicle)

$T_n = T_n (\phi, \text{roll axis } \mathbf{84})$

Thus, $T_s = T_t (v, \phi) + T_n (\phi, \text{roll axis } \mathbf{84})$

For steady-state (i.e., all dynamic variables are constant) $T_s$ must equal zero, which means that the negative and positive torques must be equal in magnitude. To execute a turn the rider increases the roll axis 84, which increases the magnitude of $T_n$ which in turn makes $T_s$ negative therefore making $\phi$ larger which causes the vehicle to turn and increasing $T_t$ to the point where it balances $T_n$ making $T_s$ equal to zero again. The vehicle rider system will stay in steady-state until the rider decides to change the roll axis 84 again.

This general process described above works very well as long as the sensitivity of $T_t$ is large enough to counter Tn. This sensitivity is large enough if the speed is above a certain value depending on the design of the vehicle (e.g., the value of the trail 60), if the speed is less than this value then the in-line vehicle cannot be easily controlled and steered.

To eliminate this low-speed stability problem that is encountered every time a rider starts from zero velocity, a torque generator 32 provides an auxiliary source of torque. The torque generator 32 provides the appropriate positive torque in response to $\phi$ at low speeds without negatively affecting operation at speeds above the critical velocity threshold.

C. Torque Generator (TG)

A torque generator 32 is a feature incorporated into the design of an in line two-wheeled vehicle that assures rideability throughout the entire velocity range. Thus, a torque generator 32 provides a positive torque to assist $T_t$ when it is too small to balance the negative torque of Tn.

Since both Tn and Tt are a function of $\phi$ it follows that the torque from the torque generator 32 must also be a function of $\phi$, stated mathematically as:

$T_{TG} = T_{TG}(\phi)$

It now follows that $T_s$, which is the sum of all torques about the steering axis 54 will be the .um of three components:

$T_s = T_t(v, \phi) + T_n(\phi, \text{roll axis } \mathbf{84}) + (T_{TG}(\phi)$

With the torque generator 32 operably secured to the vehicle, user operation of the vehicle is essentially the same as previously described. The rider's desire to turn is initiated by tilting the in-line two wheeled vehicle, which increases the roll angle 84. This action increases $T_n$ which causes $T_s$ to become non-zero in a negative sense. The negative $T_s$ will increase $\phi$, which increases $T_t$ and $T_{TG}$ to a point where the sum of $T_t$ and $T_{TG}$ become equal in magnitude to $T_n$. This means $T_s$ will be zero and $\phi$ will stop increasing.

Torque generator 32 structures may be formed with various qualities and features. In general, the torque generator 32 can produce the desired torque using elastic structures such as springs (FIGS. 4 & 5) and the like, mechanical linkages (FIGS. 6-9), dampeners (FIGS. 10-13), or combinations thereof. Examples of these types of structures are discussed further below.

D. Exemplar Torque Generator Structures

1. Elastic-Biased Torque Generators

The torque generated by a spring based torque generator 32 is a function of spring rate and the preload on the spring. Contrast this to the torque generated by the roll axis 84 via $T_n$. The sensitivity of $T_n$ to the roll axis 84 is a function of the rider's weight. Therefore, it is usually necessary to adjust the spring in response to different riders' weights to match the torque generator 32 to the performance of $T_n$.

a. Radial Spring Torque Generator

Figure 4:
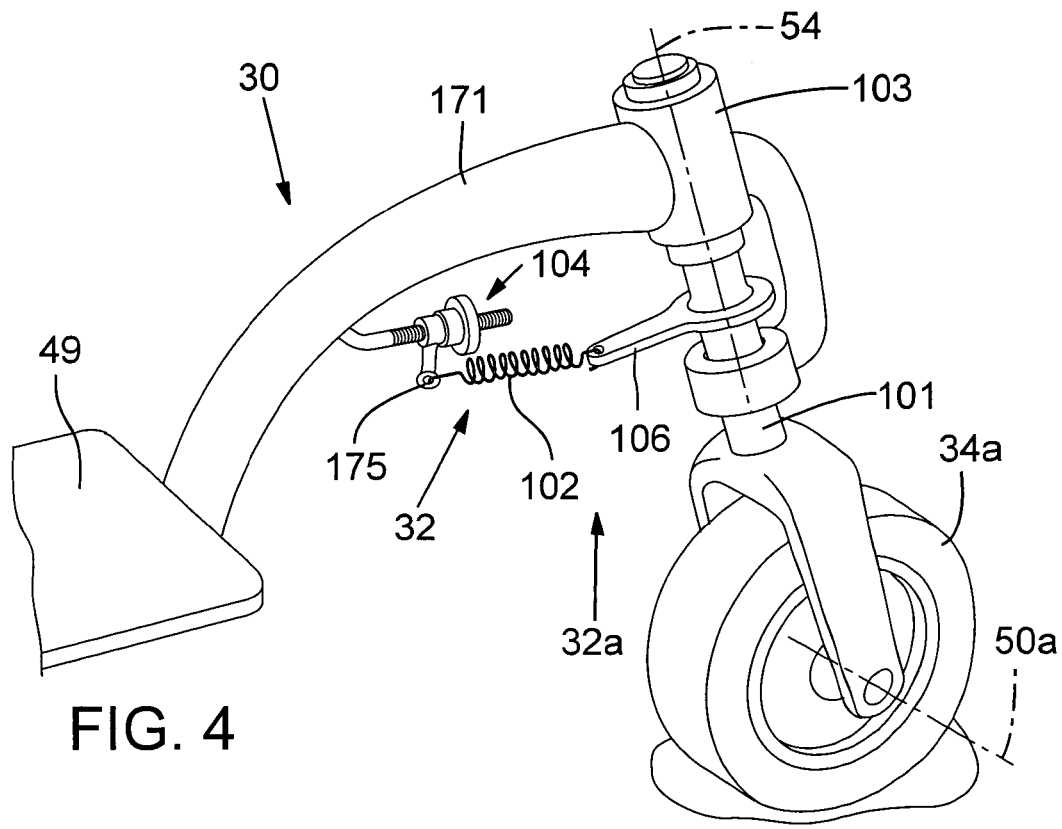
FIG. 4 is an enlarged, partial, isometric view of a possible torque generator in accordance with an embodiment of the present invention.

The concept of the radial spring torque generator 32*a* is depicted schematically in FIG. 4. The steering wheel 34*a* is operably secured to shaft 101, with shaft 101 pivotally secured to the frame 171 at steering head 103 to define pivot axis 54. A radial arm 106 extends from the shaft 101, and a resilient member, such as a spring 102 is secured between the frame 171 and the radial arm 106 as shown.

The resilient member is preloaded so the two attachment points define a line that intersects the Steering axis when Tn is zero which defines the null position of the torque generator. Note that this is a different null position than that of the null position associated with the wheels. These two null positions should be aligned.

To execute a turn, the magnitude of $T_n$ increases and induces the steering assembly to turn that causes the force of the spring to effect its force through a moment arm about steering axis causing a torque to counter the given value of $T_n$. The moment arm is the product of the radial arm times the sine of the steering angle. Therefore, in general, since torque is the product of distance times force it follows that the torque generated is a product of the moment arm length spring preload and $\phi$ (sine $\phi$)=$\phi$ for small values of $\phi$. Thus, the torque $T_{TG}$ will be a function of the steering angle.

Preferably, in order to match the torque from the torque generator with the torque from $T_n$, an adjustment structure 104 is provided in the attachment points of the spring 102 to the frame 171 so that the attachment point 175 can be moved so as to vary the preload on the spring as shown in FIG. 4.

b. Tangential Spring Torque Generator

Figure 5:
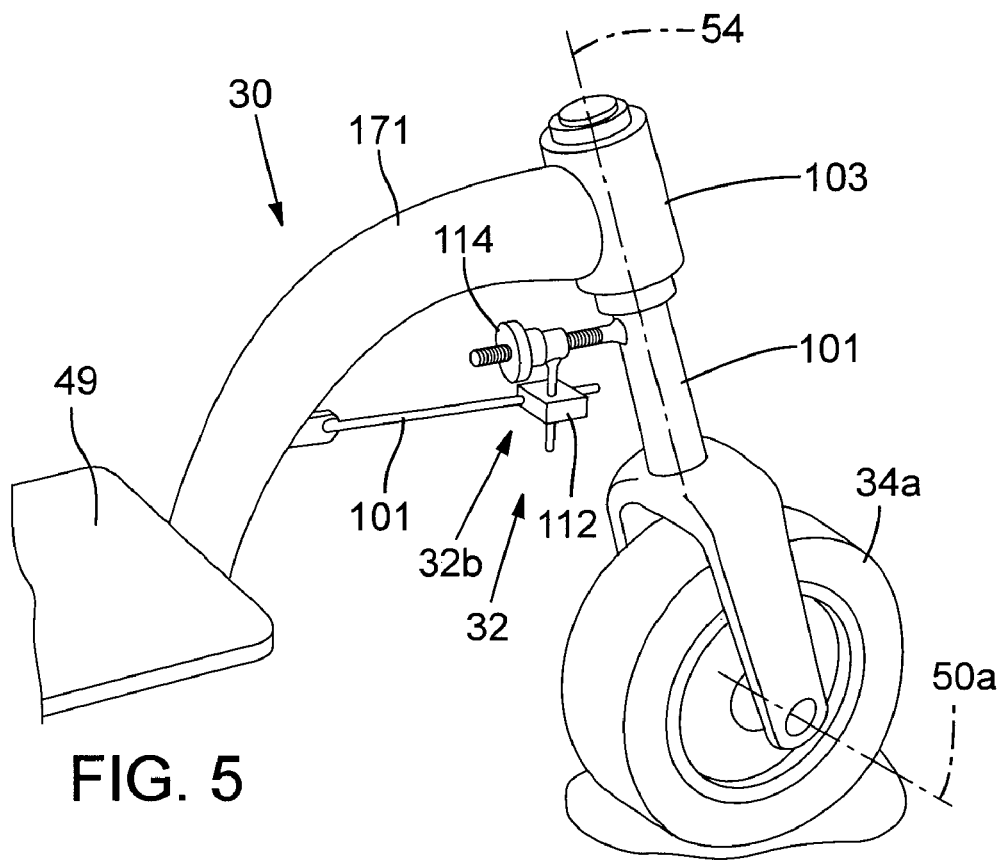
FIG. 5 is an enlarged, partial, isometric view of a second possible torque generator in accordance with an embodiment of the present invention.

Referring to FIG. 5, a tangential spring assembly 101 may also be used as the torque generator 32. The tangential spring torque generator 32*b* differs from the radial spring torque generator 32a (FIG. 4) in that the tangential spring 101 varies the force as a function of φ directly.

The moment arm attached to the steering assembly is connected to the rod spring via a slider 112. The moment arm 113 and spring 101 enter the slider 112 at approximately a right angle and both are free to move axially, as well as rotationally, with respect to the slider 112. Since the steering assembly moves about the steering axis 54, the moment arm 113 moves the slider 112 that moves the spring 101 causing a larger force, thereby causing a larger positive torque.

A mechanical device 114 is preferably attached toward the end of the spring 101 that is attached to the steering assembly such that the device can move the slider 112 along the spring 101 varying the effective length of the spring 101, thereby varying the spring rate in response to different rider weights or different desired riding characteristics. As with the radial spring torque converter 32a (FIG. 4), this feature is preferably provided to respond to different rider weights.

2. Mechanical Linkage Torque Generators

Torque can be generated in accordance with the present invention using mechanical linkages and leverage rather that relying solely on elastic materials. In general, the linkages are configured so as to apply the desired torque when the roll angle 84 of the vehicle 30 is increased or the steering wheel 34a is turned from a defined neutral position. Accordingly, unlike spring-based torque generators, these structures automatically compensate for a rider's weight.

a. Cam-Follower: Axial Torque Generator

Figure 6:
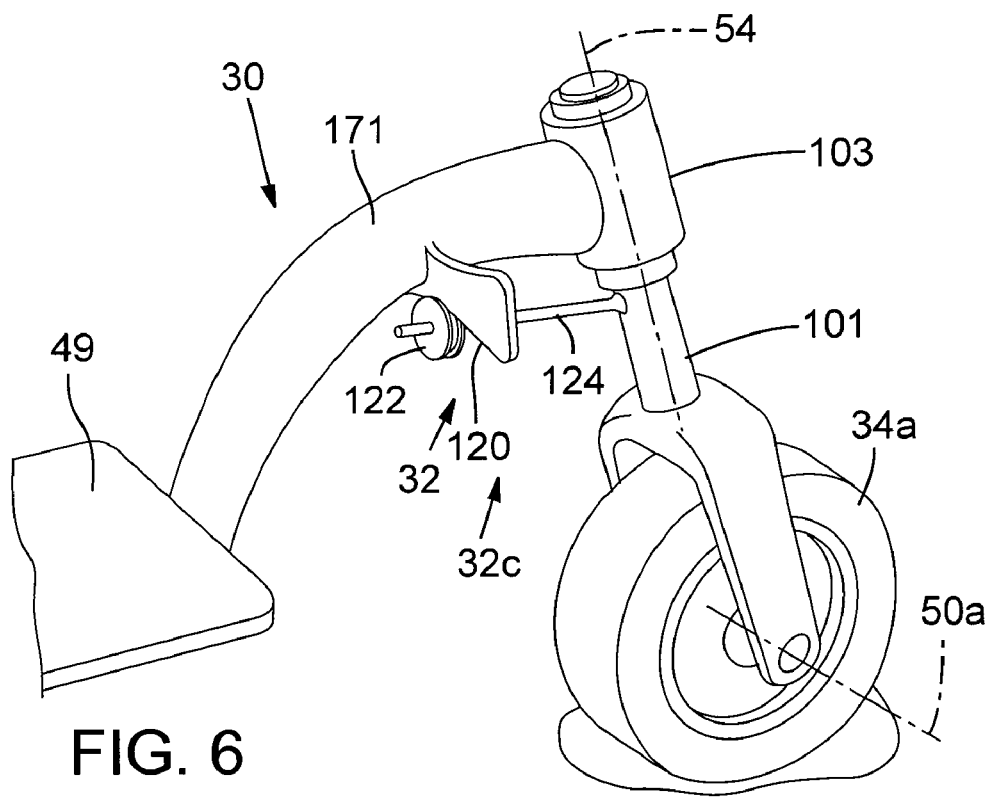
FIG. 6 is an enlarged, partial, isometric view of a third possible torque generator in accordance with an embodiment of the present invention.

Referring to FIG. 6, an axial cam-follower torque generator 32c is disclosed. The steering assembly preferably includes a follower 122 operably secured to the steering shaft 101. A concave surface (cam) 120 is secured to the frame 171 of the vehicle 30 such that the follower 122 rides along the surface 120. The highest portion of the concave surface 120 is preferably positioned so that the steering wheel 34a is aligned with the rear wheel 34b. Accordingly, when a rider stands on the board, the torque generator 32c applies a torque when the steering wheel 34a is urged away from its neutral straight position.

It can be seen that the axial movement of the steering assembly in the steering head, causes the force between the cam and the follower to be a function of the rider's weight. In the null position (i.e, roll angle 84 and φ are zero) the force between the cam and the follower lies in a plane that is defined by the point of contact between the cam and the follower and the steering axis Accordingly, there is no torque being generated. As the rider starts a turn, the roll angle 84 is increased in value that makes φ change in value that moves the cam with respect, to the follower. As this happens, the force between the cam and the follower leaves the plane defined by the point-of-contact of the cam and the follower and steering angle thereby causing a positive torque. Note that the force between the cam 120 and the follower 122 will always be perpendicular to the plane that is simultaneously tangent to both the cam 120 and the follower 120 at the contact point. This positive torque will grow until it equals the negative torque generated by the roll angle 84.

Figure 16:
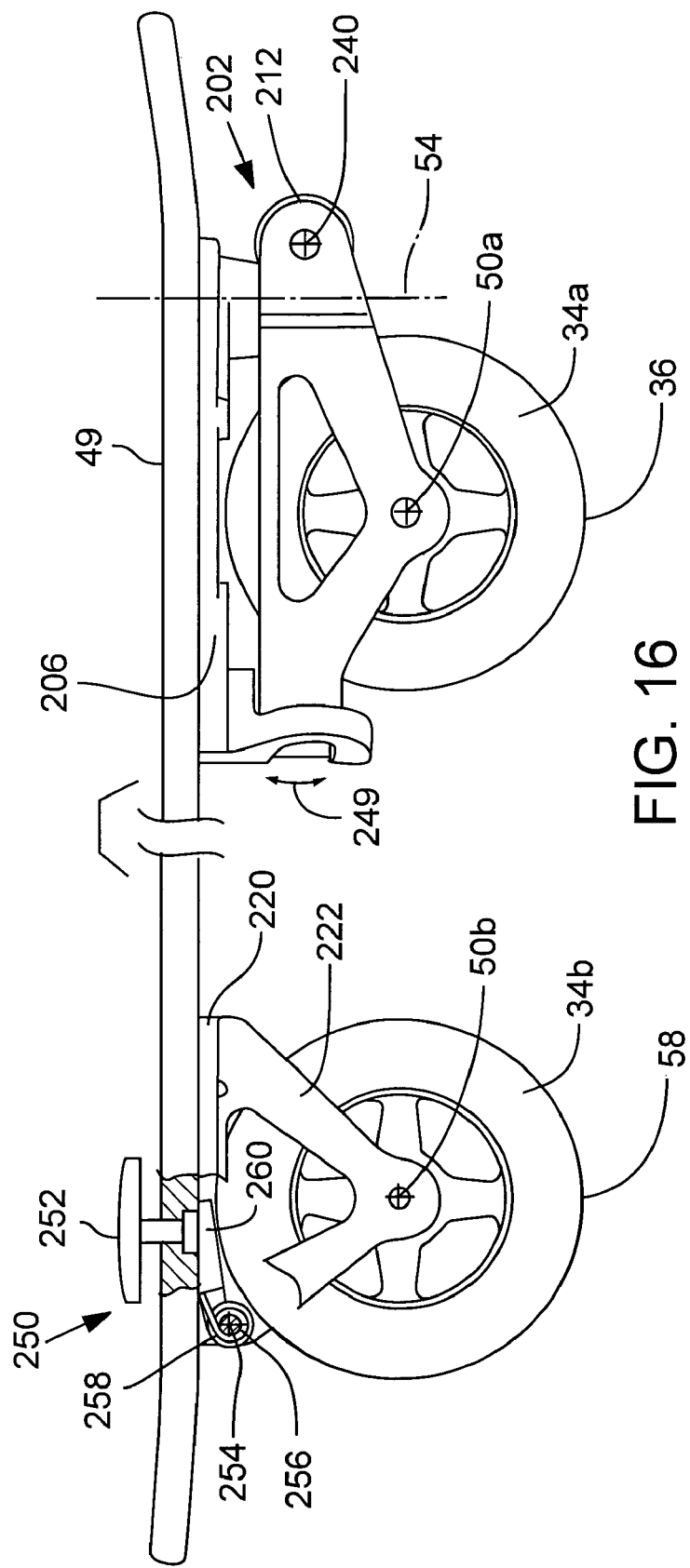
FIG. 16 is a side view of the in-lined two-wheeled vehicle of FIG. 14.
Figure 17:
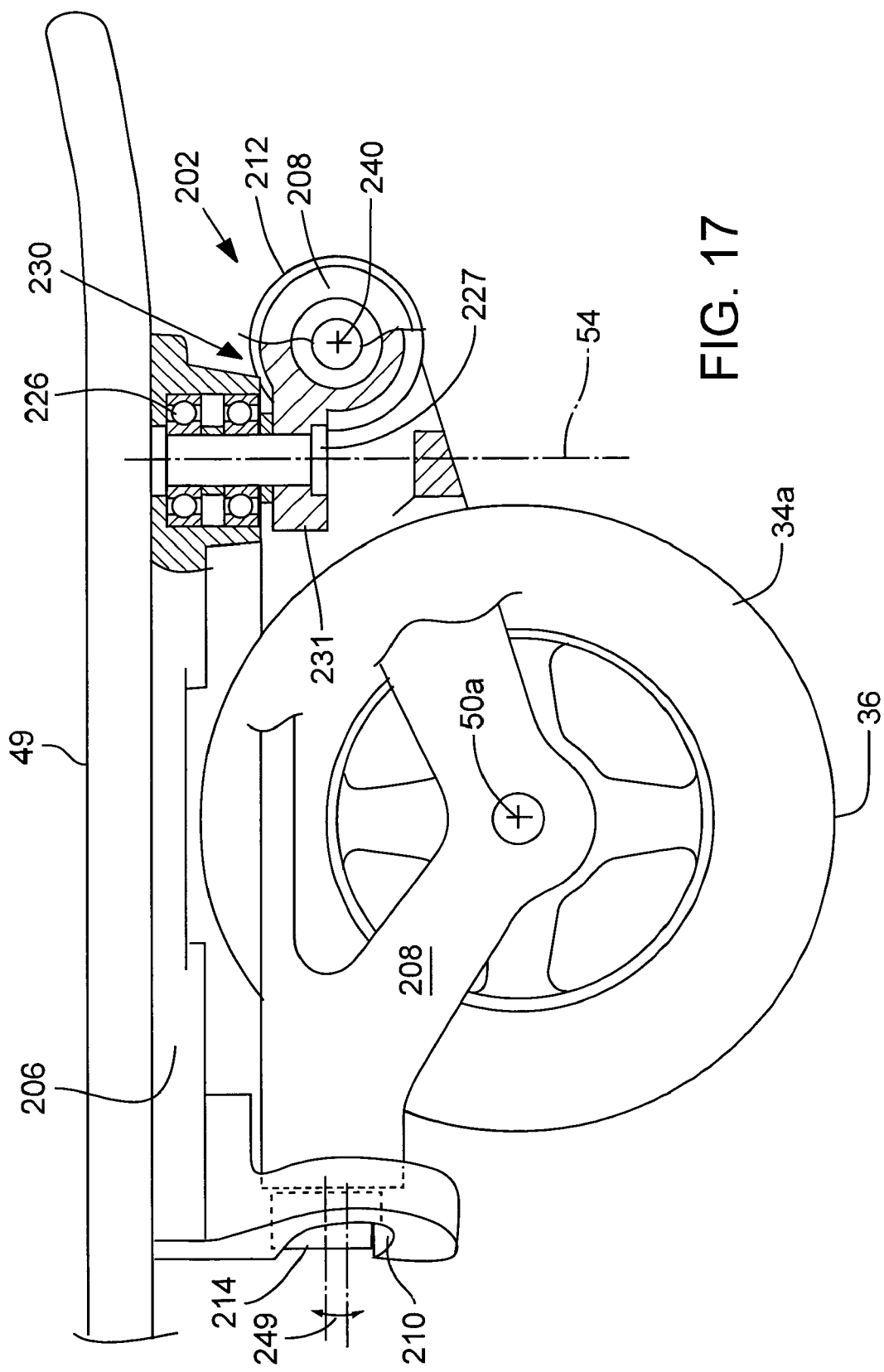
FIG. 17 is an enlarged fragmentary side view of the torque generator of FIG. 14 showing internal detail.

Referring to FIGS. 14-17, an alternative in-line two wheeled vehicle 200 having an alternative cam-follower torque generator 202 is disclosed. A base portion 206 is operably secured to the riding board 49. The base portion includes a pivot pin 227 extending substantially perpendicular therefrom as best shown in FIG. 17.

The steering wheel 34a is preferably pivotally secured at axis 50a to frame 208; The frame is pivotally secured to a pivot block 212 defining forward pivot axis 240 thereby allowing the frame to pivot in the direction of arrow 249 (FIGS. 16 & 17) as needed. A flange 231 extends from the pivot block 212. The flange 231 includes an opening for allowing the pivot block 212 to be pivotally secured to the pivot pin 227 extending from the base portion 206. Pivot pin 227 defines the steering axis 54 of the two-wheeled vehicle 200 and allows the frame to pivot about the steering axis 51 as shown in FIG. 15. Preferably, suitable engaging hardware (not shown), such as washers (not shown), bearings 226, lock nuts (not shown), and if needed biasing coil strings (not shown) are operably secured between these pivoting engaging structures as needed for the particular environment and loads expected by the in-line vehicle during use.

The opposite end of the frame is a slider engaging portion 214 for slidably engaging slot 210 extending from the base portion 206 as shown. Preferably the slot 210 is arcuate so as to provide its highest vertical point when the steering wheel 34a is aligned with the rear wheel 34b as shown in FIG. 14.

More preferably, the base portion 206 has a flat upper surface with mounting holes 224 extending therethrough. Accordingly, the frame 202 (which is also commonly known as a "truck") may be easily installed on a users existing board. For example, a user may remove the trucks of a skateboard and install the frame of the present invention on that board to easily convert his or her skateboard into an in-line, two-wheeled vehicle 30.

A rear frame 204, preferably having a flat upper surface 220 with mounting holes 224 therethrough, is also secured to the board 49 as shown so as to place the rear wheel 34b in-line with the steering wheel 34a.

Preferably, a brake assembly 250 is provided on the rear wheel 34b as shown in FIG. 16. This brake assembly 250 preferably includes a wheel engaging portion 260 pivotally secured to the frame 204 at pivot axis 256 the wheel engaging portion 260 is biased, for example by coil spring 258, to a non-engaged position as shown in FIG. 16. A sliding rod 251 is operably secured to the board 49 so as to engage the wheel engaging portion 260 and drive the wheel engaging portion 260 toward the rear wheel 34b. The sliding rod 251 is of sufficient length to extend above the surface of the riding board 49, and preferably has a cap or foot engaging portion 252 at its distal end opposite the wheel engaging portion 260.

Accordingly, when a rider desires to stop or slow the vehicle 200, he or she simply steps on the foot engaging portion 260 to slide the sliding rod 251 toward the wheel engaging portion 260, thereby causing the wheel engaging portion 260 to contact the spinning rear wheel 24b and slow the vehicle 200.

b. Cam-Follower: Swing Arm Torque Generator

Figure 7:
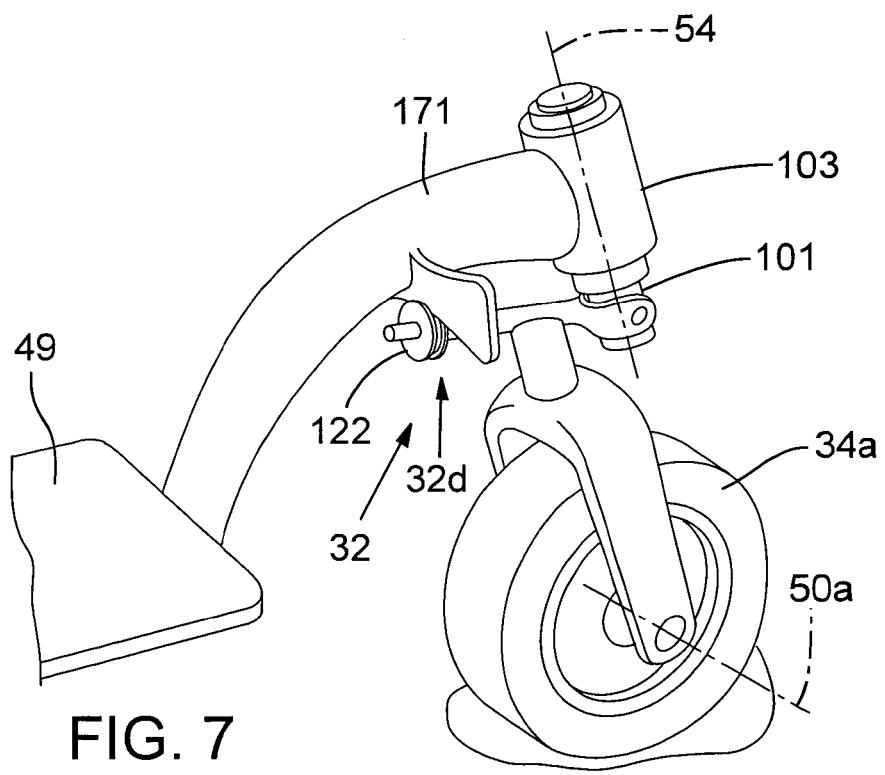
FIG. 7 is an enlarged, partial, isometric view of a fourth possible torque generator in accordance with an embodiment of the present invention.

Referring to FIG. 7, a cam-follower swing arm torque generator 32d is disclosed. The steering assembly preferably only rotates about the steering axis with respect to the steering head. An alternative mechanization can be realized by moving the second degree of freedom outside of the steering head. Here the steering column will rotate within the steering head.

In the swing-arm mechanization, the force due to the weight of the rider and vehicle will be modulated in the direction to generate the positive torque as is done in the axial mechanization.

c. Hanger-Axial Torque Generator

Figure 8:
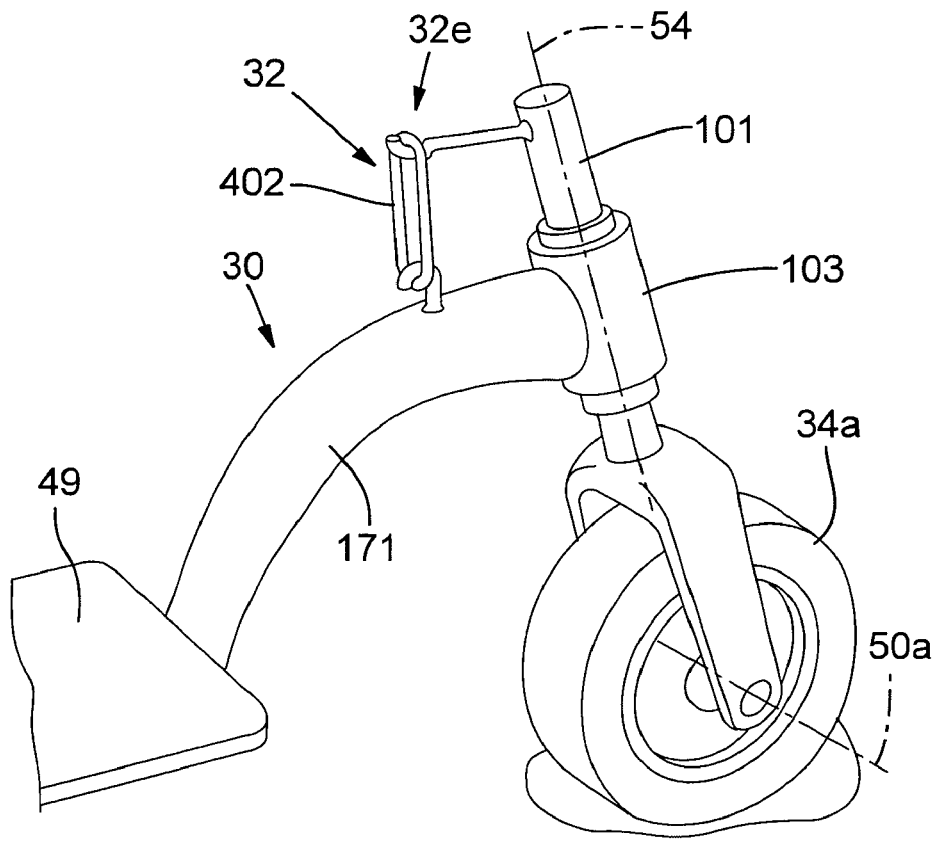
FIG. 8 is an enlarged, partial, isometric view of a fifth possible torque generator in accordance with an embodiment of the present invention.

Referring to FIG. 8, an axial hanger torque generator 32e is disclosed. The axial hanger Torque generator 32e is relatable to the axial cam follower torque generator 32a (FIG. 4) in that for both of them the steering assembly is allowed to move in the steering head 103 in both a rotational manner as well as an axial direction.

The force necessary to support the vehicle 30 and the rider is transmitted to the steering assembly by means of a link 402.

In the null position the force transmitted from the link 402 to the moment-arm through the contact point of the two elements. This contact point is located in a plane (null plane) that is defined by the point of contact of the steering wheel 34*a* and the steering axis 54 and thereby generates no torque around the steering axis 54.

The rider initiates a turn by tilting the vehicle 30 producing a nonzero roll angle 84 that in turn generates a negative torque and gives a non-zero φ. The moment-arm and the point of contact with the link moves away from the null plane and moves the force at the point of contact out of the null plane. This produces a positive torque that balances that negative torque produced by the non-zero roll angle 84 that causes the steering assembly to stop rotating with respect to the steering head 103.

Using links 402 of differing lengths can vary the handling quality, of an in-line wheeled vehicle.

d. Hanger Swing-Arm Torque Generator

Figure 9:
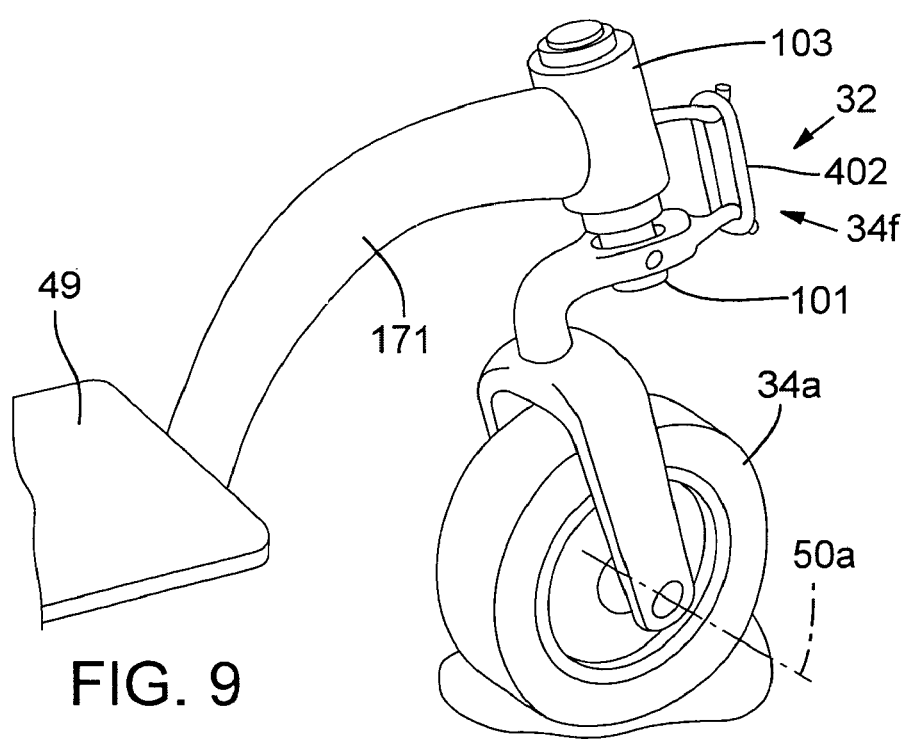
FIG. 9 is an enlarged, partial, isometric view of a sixth possible torque generator in accordance with an embodiment of the present invention.

The basic elements of and exemplar swing-arm hanger torque generator 32*f* are shown in FIG. 9. In this mechanization the steering shaft 101 only rotates in the steering head 103 and no axial movement is present. The principle of operation of the swing-arm hanger torque generator 32*f* is the same as the axial hanger torque generator 32*e* (FIG. 8). This alternate approach to the hanger torque generator is another option to designing the torque generator component of an in-line two wheeled vehicle 30.

3. Dampening Torque Generator

Figure 10:
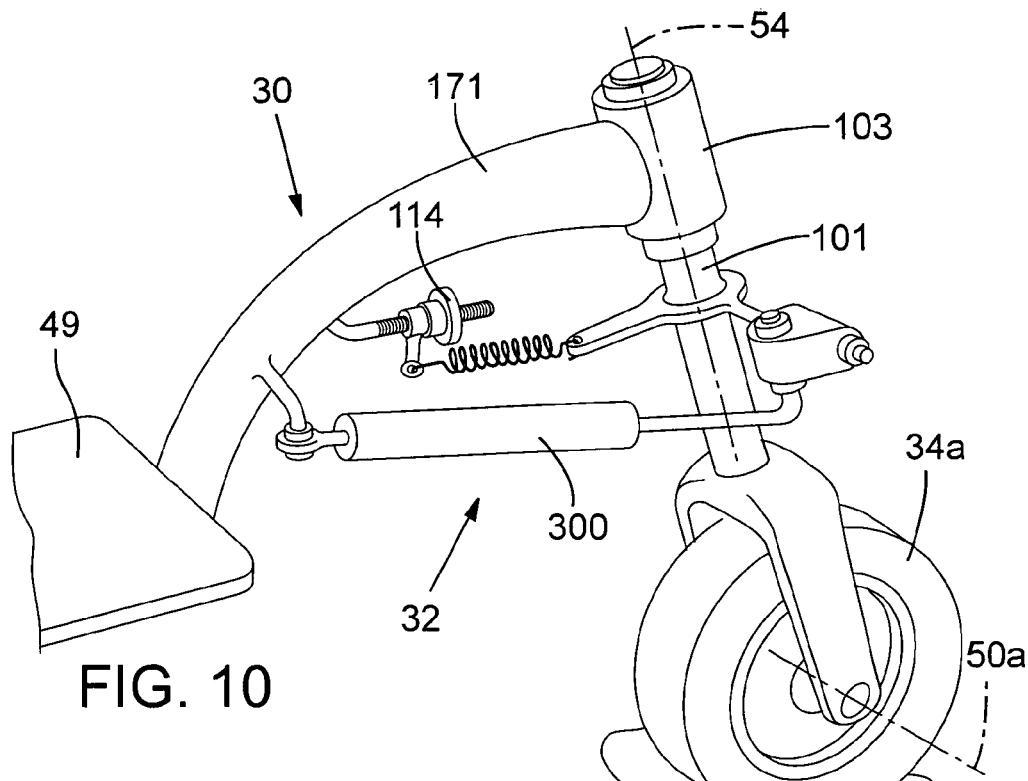
FIG. 10 is an enlarged, partial, isometric view of a seventh possible torque generator in accordance with an embodiment of the present invention.

Referring to FIG. 10, a dampener 300 can also be operably secured between the frame 171 of the vehicle 30 and the steering shaft 101 so as to limit movement of the steering wheel 34*a*, particularly during slow speeds of the vehicle 30. The dampener 300 is preferably sized so as to resist rotation of the steering wheel 34*a* when low torque is proved about the steering axis 54, but not unduly limit rotation of the steering wheel 34*a* about the steering axis 54 at higher speeds of the vehicle 30.

4. Exemplar Control System.

Figure 12:
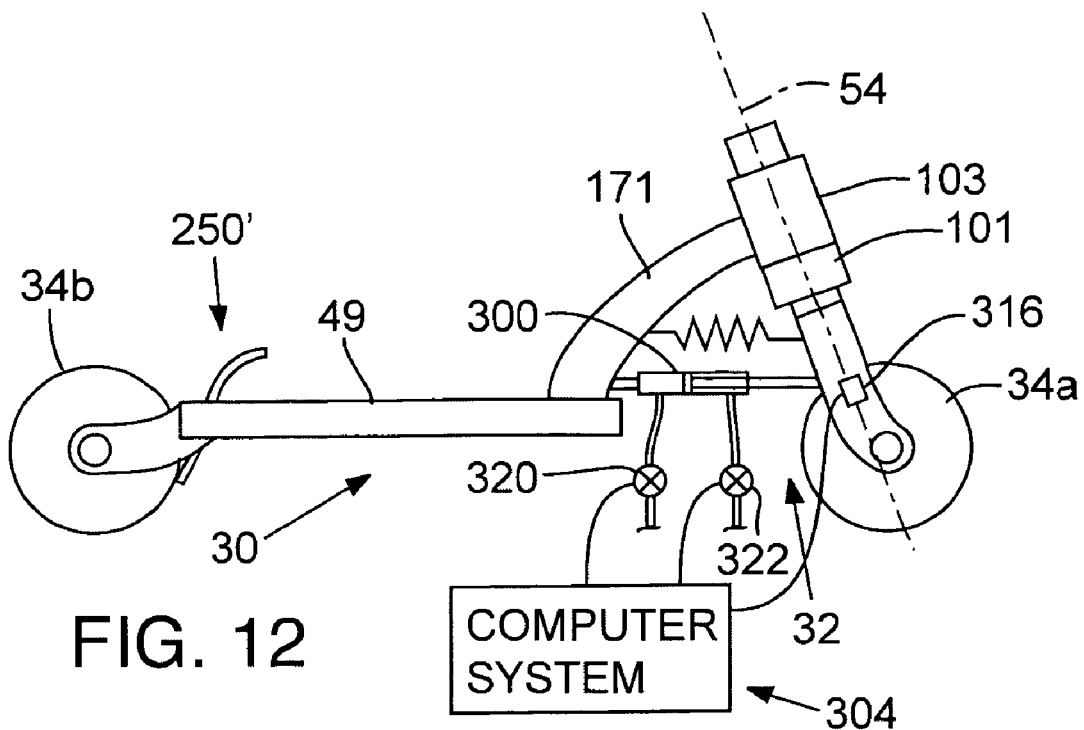
FIG. 12 is a schematic view of a possible control system for the torque generator of FIG. 11.

More preferably, a control system 304 is provided so as to activate the torque generator 32 during predetermined events, such as at slow speeds of the vehicle 30. Schematic diagrams of exemplar control logic 302 (FIG. 13) for such a system 304 (FIG. 12) is shown in FIGS. 12 and 13.

Figure 11:
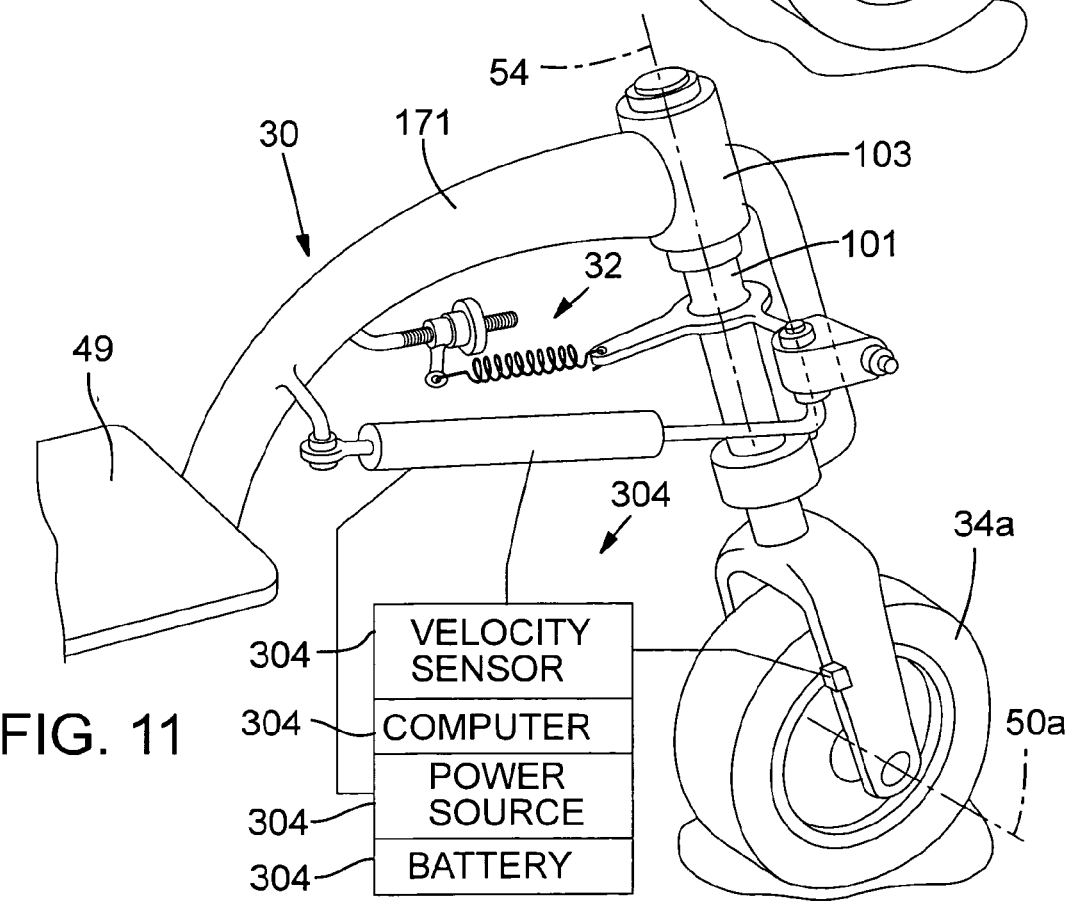
FIG. 11 is an enlarged, partial, isometric view of a possible electronic control system secured to a torque generator in accordance with an embodiment of the present invention.

Referring to FIG. 11, the control system 304 includes a computer 310 having memory, a power source 312, and input and output devices as needed. It is in communication with a sensor 316, such as a speed sensor that is operably secured to the vehicle 30. The dampener 300 is in pneumatic communication with one or more valves 320. The values are in communication with the computer system 304 and can be activated when commanded by the computer system 304.

Figure 13:
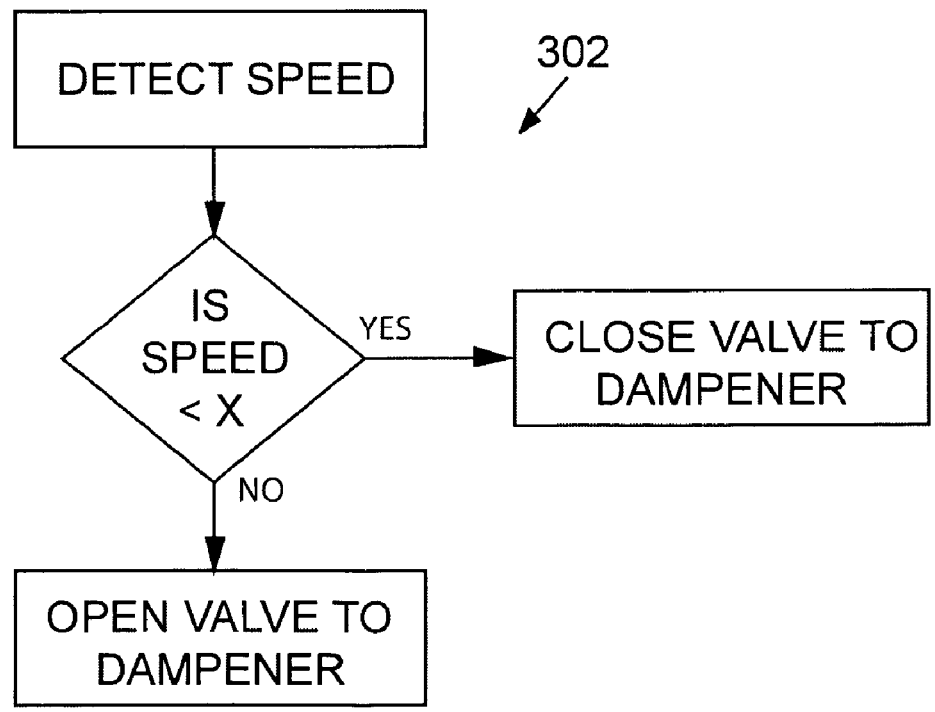
FIG. 13 is a schematic flow chart of exemplar control logic for the control system of FIG. 12.

As shown in FIG. 13, when the sensor detected speed of the vehicle is below a predetermined value, the computer system commands the valves 320 to close, thereby activating the dampener 300 to generate a torque at slow speeds.

As the speed of the vehicle increases to exceed the predetermined value "X", the computer system commands the valves 320 to open, thereby preventing torque from being generated by the dampener 300 during transient movement of the steering wheel 34*a*.

E. Additional Features

In view of the wide variety of embodiments to which the principles of the invention can be applied, it should be apparent that the detailed description of a preferred embodiment is illustrative only and should not be taken as limiting the scope of the invention. For example, the principles of the present invention work equally well whether the vehicle 30 is self-propelled, rider-propelled, gravity propelled, or propelled by other sources, such as the wind. Accordingly, the vehicle of the present invention could readily include forms of propulsion, such as a motor, bicycle chain and peddle system, sail, or other forms of propulsion without compromising the principles of the present invention.

In addition, depending on the terrain in which the operator plans to ride the vehicle, traditional suspension linkages can also be included to offer a smoother ride to the rider without compromising the benefits of the present invention. Also, although not required to control or stabilize the vehicle, traditional handlebars, or a support bar can extend along the steering axis or from the base, to facilitate rider balance on the vehicle. Similarly, one or more brakes 250 (FIG. 16), 250' (FIG. 12), such as a handbrake or foot operated brake is preferably provided to allow a user greater control over the vehicle.

Accordingly, the claimed invention includes all such modifications as may come within the scope of the following claims and equivalents thereto.

I claim:

1. A two-wheeled vehicle for operating on a riding surface, said vehicle having:
    a frame tiltable about a longitudinal center line;
    a first wheel pivotally secured to said frame, said first wheel having a first area of contact with the riding surface;
    a second wheel pivotally secured to said frame, said second wheel having a second area of contact spaced apart from said first area of contact;
    a steering axis extending from said frame and intersecting said riding surface at a point, said point, first area of contact and second area of contact substantially aligned during steady-state straight movement of said vehicle;
    said first wheel pivotable about a shaft to define said steering axis to steer said two-wheeled vehicle by tilting said frame about said longitudinal center line; and,
    a torque generator operably engaging said shaft to apply an auxiliary torque about said steering axis during transient movement of said vehicle.

2. The two-wheeled vehicle of claim 1, where the amount of auxiliary torque generated by said torque generator substantially balances the natural occurring torques arising about said steering axis.

3. The two-wheeled vehicle of claim 2, wherein said torque generator substantially balances the natural occurring torques about said steering axis at slow operating speeds of the two-wheeled vehicle.

4. A two-wheeled vehicle for operating on a riding surface, said vehicle having:
    a frame tiltable about a longitudinal center line;
    a first wheel pivotally secured to said frame, said first wheel having a first area of contact with the riding surface;
    a second wheel pivotally secured to said frame, said second wheel having a second area of contact spaced apart from said first area of contact;
    a steering axis extending from said frame and intersecting said riding surface at a point, said point, first area of contact and second area of contact substantially aligned during steady-state straight movement of said vehicle;
    said first wheel pivotable about said steering axis to steer said two-wheeled vehicle by tilting said frame about said longitudinal center line;
    a torque generator operably engaging said first wheel to apply an auxiliary torque during transient movement of said vehicle; and,
    a computer system in communication with said torque generator and a sensor, and said computer system activated said torque generator only upon predetermined condition being detected by said sensor.

5. The two-wheeled vehicle of claim 4, wherein said sensor is a speed sensor, and said predetermined conditioned is the detected speed of the vehicle being below a predetermined level.

6. The two-wheeled vehicle of claim 2, wherein said torque generator is formed by an elastic element operably extending between said frame and said first wheel.

7. The two-wheeled vehicle of claim 2, wherein said torque generator is formed by a mechanical linkage operably engaging said shaft.

8. The two-wheeled vehicle of claim 2, wherein said torque generator is formed by a dampener operably engaging said shaft.

9. The two-wheeled vehicle of claim 1, wherein said first and said second wheels are secured to trucks, and said trucks are detachably secured to said frame.

10. The two-wheeled vehicle of claim 1, wherein the vehicle is ridden by riders having different weights, and the auxiliary torque generated by said torque generator is proportional to the weight of each rider.

11. The two-wheeled vehicle of claim 1, further including a brake for operably engaging the second wheel.

12. An in-line two-wheeled vehicle truck system for a riding board comprising:
a front truck portion having a front wheel mounting portion, a frame portion, and a front wheel pivotally secured to said frame portion, said wheel pivotal about a shaft to define a steering axis;
a torque generator operably secured to said shaft and operably engaging said front wheel to apply an auxiliary torque about said steering axis during transient movement of said front wheel;
a rear truck portion having a rear wheel mounting portion, a rear frame portion, and a rear wheel pivotally secured to said rear frame portion; wherein,
said front truck portion and said rear truck portion are detachably securable to a substantially planar member to define an in-line two wheeled vehicle.

13. The in-line two-wheeled vehicle truck system of claim 12, wherein said substantially planar member is an off-the-shelf skateboard board.

14. The in-line two-wheeled vehicle truck system of claim 12, further including a brake structure operably engaging said rear wheel.

15. The in-line two-wheeled vehicle truck system of claim 14, wherein said brake structure include a foot pedal portion positioned on the substantially planar member, said foot pedal portion operably secured to a braking structure so as to engage said brake by a user stepping on said foot pedal portion.

16. The in-line two-wheeled vehicle truck system of claim 12, wherein said torque generator includes a cam that operably engages a concave surface, and said concave surface is positioned so as to optimize the auxiliary torque generated.

17. A two-wheeled vehicle for operating on a riding surface, said vehicle having:
a frame tiltable about a longitudinal center line;
a first wheel pivotally secured to said frame, said first wheel having a first area of contact with the riding surface;
a second wheel pivotally secured to said frame, said second wheel having a second area of contact spaced apart from said first area of contact;
a steering axis extending from said frame and intersecting said riding surface at a point, said point, first area of contact and second area of contact substantially aligned during steady-state straight movement of said vehicle defining a neutral position;
said first wheel pivotable about a shaft to define said steering axis to steer said two-wheeled vehicle by tilting said frame about said longitudinal center line;
a dampener operably secured to said shaft so as to operably engage said first wheel to apply an auxiliary torque about said steering axis and to the first wheel by resisting movement of said first wheel about said steering axis.

18. The two-wheeled vehicle of claim 17, further including a biasing structure operably engaging said first wheel, said biasing structure biasing said first wheel to said neutral position.

19. The two-wheeled vehicle of claim 18, wherein said biasing structure is a spring.

20. The two-wheeled vehicle of claim 17, wherein said dampener is a pneumatic dampener in communication with a control system, and said dampener is activated on predetermined criteria detected by said control system.

* * * * *